R. Cantelon.
Cultivator.
N°63,610. Patented Apr. 9, 1867.
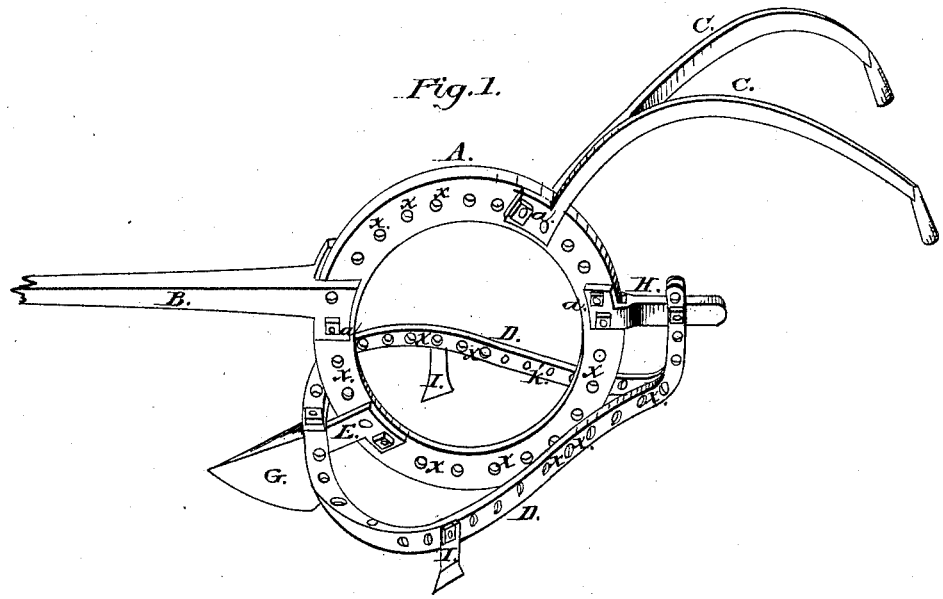
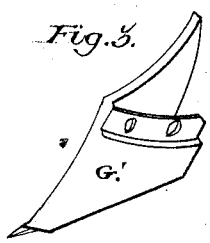
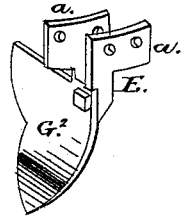
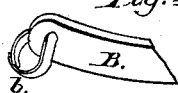
WITNESSES:
A. N. Marr
W. Stockbridge
INVENTOR:
R. Cantelon
per
Alexander V. Mason
Atty.

United States Patent Office.

RAINSFORD CANTELON, OF MONTGOMERY, ALABAMA.

*Letters Patent No. 63,610, dated April 9, 1867.*

IMPROVEMENT IN PLOUGHS.

*The Schedule referred to in these Letters Patent and making part of the same.*

TO ALL WHOM IT MAY CONCERN:

Be it known that I, RAINSFORD CANTELON, of Montgomery, in the county of Montgomery, and in the State of Alabama, have invented certain new and useful Improvement in "Ploughs," and do hereby declare that the following is a full, clear, and exact description thereof. reference being had to the accompanying drawings, and to the letters of reference marked thereon.

In the annexed drawings, making part of this specification, A represents a rim-wheel, which is made of metal, and I prefer its being made wrought. The diameter of this wheel will be made usually about twelve (12) inches from inside to inside, the rim being made as deep as may be required, from one inch and a half to six inches. For ordinary ploughing the depth of the rim may be one inch and a half, and its width may be about a half inch. $x\ x$ represent a series of holes made around this rim-wheel, being punched through its centre from side to side. These holes may be made either round or square, and from three-eighths to half an inch in diameter. B represents the beam, and C C the handles of the plough, which are made in any of the known and usual ways. The end of the beam is provided with jaws, between which the rim fits, said jaws being provided with holes through which bolts pass to secure it firmly to the wheel. The ends of the handles are also provided with holes for the purpose of bolting them to the wheel on the opposite side to the beam. E represents a shank, which has a plough point secured to its lower end. The upper end of this shank is provided with holes through which it is bolted to the wheel A. D D represent two metallic bars or scrolls, which are provided with a series of holes, $x'\ x'\ x'$, for the purpose of bolting cultivator or harrow teeth to them. These bars or scrolls are intended to be bolted at the front edge of the wheel to the shank E, and at the rear edge to a bar, H, which is provided with suitable jaws for embracing the rim of the wheel, and with holes for the purpose of bolting it to said rim. The beam, the handles, the shank, and the bar H are all provided with suitable arms or flanges on their jaws or sides, $a\ a$, through which bolts pass to make them more permanent and secure upon the wheel.

I propose to use any of the known forms of plough or cultivator teeth with this wheel. A mould-board plough may be used, or the ordinary shovel-plough or scraper, or any other form of plough, only so they are properly provided with holes to be bolted to the rim. It is evident that the set of the plough may be completely regulated by shifting the beam higher or lower on the rim, the handles being moved to correspond. The handles may be lowered or raised so as to accommodate the plough to a man or boy. They may be lowered so as that a small boy can handle them, while they can be made high enough to suit a tall man. It is also evident that the shank E can be shifted so as to give the plough point any desired set. This plough may be made entirely of metal, or partially so, and its great advantages are in its portability, being light, its durability, and its capacity for a great variety of changes to adapt it to different purposes and uses.

Having thus fully described my invention, what I claim as new, and desire to secure by Letters Patent, is—

The rim-wheel A, constructed in the manner herein represented, or in any other manner substantially the same, when used with the necessary devices for forming a plough, as is herein specified.

In testimony that I claim the foregoing I have hereunto set my hand and seal this 26th day of February, 1867.

RAINSFORD CANTELON.

Witnesses:
J. S. DILLARD,
WILLIAM FRAZIER.